(12) United States Patent
Gonzalez et al.

(10) Patent No.: US 10,863,302 B2
(45) Date of Patent: Dec. 8, 2020

(54) DEFINING A CONTEXTUAL GEOFENCE

(71) Applicant: Microsoft Technology Licensing, LLC, Redmond, WA (US)

(72) Inventors: Fernando Gonzalez, Bellevue, WA (US); Hiep Khuu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 15/276,745

(22) Filed: Sep. 26, 2016

(65) Prior Publication Data
US 2018/0091940 A1    Mar. 29, 2018

(51) Int. Cl.
*H04W 4/021* (2018.01)
*G01C 21/36* (2006.01)
*H04W 4/02* (2018.01)

(52) U.S. Cl.
CPC ........ *H04W 4/021* (2013.01); *G01C 21/3679* (2013.01); *G01C 21/3697* (2013.01); *H04W 4/022* (2013.01); *H04W 4/026* (2013.01); *H04W 4/027* (2013.01)

(58) Field of Classification Search
CPC .. H04W 4/021; H04W 4/022; G01C 21/3679; G01C 21/3697
See application file for complete search history.

(56) References Cited

U.S. PATENT DOCUMENTS

| | | | |
|---|---|---|---|
| 8,471,701 B2 | 6/2013 | Yariv et al. | |
| 8,531,293 B2 * | 9/2013 | Putz | G08B 31/00 340/541 |
| 8,941,489 B2 | 1/2015 | Sheshadri et al. | |
| 9,116,818 B2 | 8/2015 | Bilange et al. | |
| 9,210,545 B2 | 12/2015 | Sabatelli et al. | |
| 2012/0306659 A1 | 12/2012 | Ben-Dayan et al. | |
| 2013/0326137 A1 * | 12/2013 | Bilange | G06F 12/0866 711/113 |
| 2014/0155094 A1 | 6/2014 | Zises | |
| 2014/0156410 A1 * | 6/2014 | Wuersch | G06Q 30/0261 705/14.58 |

(Continued)

OTHER PUBLICATIONS

Jadhav, et al., "Geolocation and Places—Analytics", In International Journal of Science Technology Management and Research, vol. 1, Issue 2, May 2016, pp. 15-21, 4 pages.

(Continued)

*Primary Examiner* — Thomas Ingram

(57) ABSTRACT

Examples generate a route point radius for a geofence. A point of interest (POI) is identified. The coordinates for a route point on a navigational path associated with the POI is obtained. A distance from the coordinates of the route point to the POI is determined to generate a radius. An extension amount to encompass at least a portion of the navigational path is added to the radius to generate a route point radius. A contextual environment of a user traveling on the navigational path is utilized to adjust the route point radius. The contextual environment includes the mode of travel and/or the direction of travel of the user. A geofence is generated based on at least one route point radius associated with the POI. An alert is triggered when a user crosses a perimeter of the geofence encompassing the portion of the navigational path.

20 Claims, 11 Drawing Sheets

(56) References Cited

U.S. PATENT DOCUMENTS

| | | | |
|---|---|---|---|
| 2015/0031388 A1* | 1/2015 | Chatterjee | H04W 4/021 455/456.1 |
| 2015/0095157 A1* | 4/2015 | McDevitt | G06Q 30/0261 705/14.58 |
| 2015/0148060 A1 | 5/2015 | Parab et al. | |
| 2015/0148061 A1 | 5/2015 | Koukoumidis et al. | |
| 2015/0176998 A1 | 6/2015 | Huang et al. | |
| 2015/0213496 A1* | 7/2015 | McDevitt | H04W 4/021 705/14.58 |
| 2016/0007156 A1 | 1/2016 | Chiou et al. | |
| 2016/0066146 A1* | 3/2016 | Jernigan | H04W 4/021 455/456.1 |

OTHER PUBLICATIONS

Namiot, et al., "Geofence and Network Proximity", In Proceedings of the Computing Research Repository, Mar. 2013, 6 pages.

"International Search Report and Written Opinion Issued in PCT Application No. PCT/US2017/051958", dated Nov. 9, 2017, 12 Pages.

\* cited by examiner

DEFINING A CONTEXTUAL GEOFENCE

BACKGROUND

Mobile computing devices are becoming more powerful and more ubiquitous. These devices are capable of performing a variety of useful functions for users, including location based functions. Location based functionality includes actions taken by the mobile computing device based on the current location of the device. Location based functions may include issuing an alert, providing navigational aids, providing reminders, or other actions performed based on the location of the mobile computing device. The location of a device may be determined using various sensors and techniques known today, such as global positioning system (GPS) satellite systems, wireless (Wi-Fi) networking, and cellular positioning.

SUMMARY

Examples of the disclosure provide a method for generating a geofence based on a route point. The coordinates for a point of interest (POI) are received. A route point corresponding to the POI is obtained. The route point is associated with a navigational path. A distance from the coordinates to the obtained route point is determined. The distance is increased by an extension amount to encompass at least a portion of a width of the navigational path to generate a route point radius. A geofence perimeter for the POI is defined using the route point radius.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
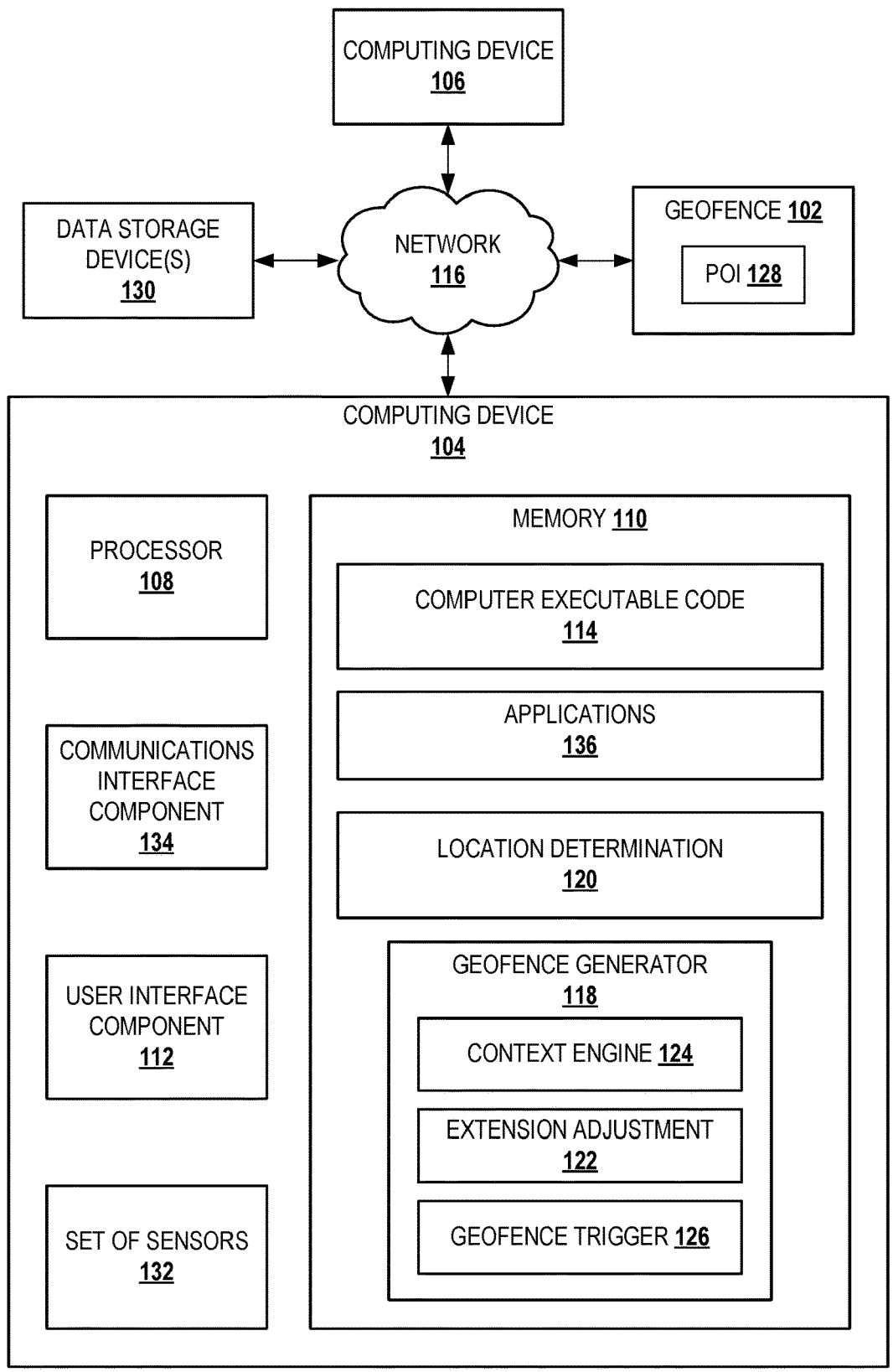
FIG. 1 is an exemplary block diagram illustrating a system for generating a geofence.

Referring to the figures, examples of the disclosure enable defining a geofence based on at least one route point radius defined by context. In some examples, a distance from a point of interest (POI) to a route point on a navigational path associated with the POI is lengthened, by an extension amount to generate a route point radius. The extension amount is adjusted based on a context (e.g., contextual environment) of a user. The contextual environment of the user includes mode of travel and/or direction of travel. The route point radius is utilized to define a geofence. A geofence is a perimeter surrounding an area that includes at least one POI.

In some examples, if a user wants to be notified when the user enters a certain POI, the operating system (OS) of a user device converts this request into a geofence of a given size, centered in the POI. Given the lack of additional data, a fixed geofence size may be used. But this is suboptimal because the size of POIs varies significantly. A geofence around a house may be approximately twenty meters (20 m) while a geofence around a mall may be a hundred meters (100 m). However, the use of a fixed size geofence results in many geofence triggers occurring too early or too late. Therefore, some aspects of the examples enable more reliable determination of a geofence perimeter based on the route point radius to reduce an error rate for triggering location based functionality of a mobile computing device.

The geofence of the examples provide for selection of the most appropriate geofence radius for the POI to enable more accurate geofence triggers that occur when the user would reasonably expect them. The utilization of one or more route point radii for generating a geofence results in creation of a more reliable geofence for different environments.

The geofence defined by the route point radius in some examples of this disclosure is more accurate and responsive to contextual environment of a user, avoiding triggering of geofence perimeters prematurely or too late for the user approaching a POI. This further enables improved user interaction with the system and improved user efficiency via user interface (UI) interaction with the geofence system.

In other examples, utilization of contextual environment of a user improves reliability and accuracy in calculating an appropriate geofence perimeter and radius that is responsive to a user's mode of travel and/or direction of travel. For example, a user traveling in a motor vehicle at speed may receive a geofence trigger too late due to the user's rate of travel. Likewise, a user traveling by foot, may receive a geofence trigger too soon due to the user's slower rate of travel. Therefore, some examples of the disclosure determine a geofence perimeter based on mode of travel or direction of travel. This enables creation of a geofence system that is more intuitive and comprehensible for both developers and users. The contextual geofence system reduces development costs and improves efficiency for developers.

In still other examples, a route point radius for a given POI is stored in a memory or another data storage device. This route point radius may be utilized to define a geofence for all users or location services that interact with the given POI. This conserves memory and reduces processor load by performing the calculations once for the POI. In other examples, the route point radius for a given POI is calculated per-user or per-application.

Referring now to FIG. 1, an exemplary block diagram illustrates a system for generating a contextual geofence perimeter based on route point radius. In the example of FIG. 1, the geofence generation system 100 is a system for defining and/or generating a geofence 102 associated with one or more computing devices, such as computing device 104 and computing device 106. The computing device 104 associated with a user represents a system for defining a geofence and/or determining when a user crossing a geofence perimeter. The computing device 104 represents any device executing instructions (e.g., as application programs, operating system functionality, or both) to implement the operations and functionality associated with the computing device.

In this example, the computing device 104 is a mobile computing device or any other portable device. In some examples, the mobile computing device includes a mobile telephone, laptop, tablet, computing pad, netbook, gaming device, a wearable computing device, and/or portable media player.

In other examples, the computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device 104 has at least one processor 108, a memory 110, and at least one user interface component 112. The processor 108 includes any quantity of processing units, and is programmed to execute computer-executable code 114 for implementing aspects of the disclosure. The computer-executable code 114 may also be referred to as computer-executable instructions. The computer-executable code 114 may be performed by the processor 108 or by multiple processors within the computing device 104, or performed by a processor external to the computing device 104. In some examples, the processor 108 is programmed to execute instructions such as those illustrated in the figures (e.g., FIG. 8, FIG. 9, FIG. 10. And FIG. 11).

In some examples, the processor represents an implementation of analog techniques to perform the operations described herein. For example, the operations may be performed by an analog computing device and/or a digital computing device.

The computing device 104 further has one or more computer readable media such as the memory 110. The memory 110 includes any quantity of media associated with or accessible by the computing device. The memory 110 may be internal to the computing device (as shown in FIG. 1), external to the computing device (not shown), or both (not shown). In some examples, the memory 110 includes read-only memory and/or memory wired into an analog computing device.

The memory 110 stores data, such as one or more applications 136. The application 136, when executed by the processor 108, operate to perform functionality on the computing device 104. Exemplary applications include mail application programs, web browsers, calendar application programs, address book application programs, messaging programs, media applications, location-based services, search programs, and the like. The applications 136 may communicate with counterpart applications or services such as web services accessible via a network 116. For example, the applications 136 may represent downloaded client-side applications that correspond to server-side services executing in a cloud.

The memory 110 further stores one or more computer-executable components. Exemplary components include a geofence generator component 118 and a location determination 120 component. The geofence generator component 118, when executed by the processor of the computing device causes the processor to generate one or more route point radii for a geofence perimeter. In some examples, the geofence generator 118 receives coordinates for a POI 128. In some examples, the coordinates include a latitude and a longitude (x, y). In still other examples, the coordinates of the POI include a latitude, longitude, and an altitude. The altitude coordinate may be included where the POI is located outdoors, on an upper floor of a multistory structure, located at a higher elevation than surrounding terrain, or otherwise located on an elevated location relative to a user's current location. For example, the POI may be located on the second floor of a building.

In some examples, the user device generates a three-dimensional (3-D) geofence. In one example, a 3-D geofence enables a user to locate a room on a third floor of a structure located at a particular address or located a particular level of a stadium or other building. If the POI is on the third floor, the geofence does not trigger on the first or second floor. The geofence triggers when the user reaches the third floor.

The POI 128 may be any point of interest located off a navigational path. A POI may include, without limitation, a landmark, a building, a room within a building, a particular floor within a multi-story building, a picnic area, a scenic spot or overlook, historical marker, a sports playing field, an outdoor pavilion, or any other POI located remotely from a navigational path. A landmark may include any structure, sign, geographical feature, or any other landmark. In one example, a landmark may include a building in a complex, such as "Building 2" or a civic address.

A navigational path, which may also be referred to as a navigable path, is any type of trail, road, street, or other path for travel by foot, by motor vehicle, by bicycle, or any other vehicle. A navigational path may include a foot path, sidewalk, jogging trail, bike path, road, highway, freeway, hiking trail, or alley.

The coordinates may be received from a user, obtained from a map, or obtained from any other source. In some non-limiting examples, the coordinates are obtained from a mapping application or provider.

The geofence generator 118 obtains a route point corresponding to the POI 128. The route point is a point or location on a navigational path. In some examples, the route point is an address. An example of a route point includes, without limitation, the address One Microsoft Way, Redmond, Wash. 98052. The geofence generator 118 determines a distance from the coordinates of the POI 128 to the obtained route point coordinates. The geofence generator 118 adds an extension amount to the determined distance to generate the route point radius.

An extension adjustment 122 component determines or defines the extension amount. In some examples, the extension adjustment 122 selects the extension amount based on dynamic contextual environment data, such as a mode of transportation of a user, a speed of travel, a direction of travel, and/or any other real-time contextual data associated with the user. For example, if the user is walking along a sidewalk, the extension amount may be decreased from a default amount. However, if the user is riding in a motor vehicle, the extension amount may be increased from a default amount to encompass a greater portion of the navigational path (e.g., roadway).

In other examples, the extension adjustment 122 selects the extension amount based on the type of navigational path. For example, if the navigational path is a sidewalk, a jogging trail, or a bike path, the extension adjustment 122 selects a smaller extension amount. In other examples, if the navigational path is a six lane roadway, the extension adjustment selects a larger extension amount. For example, an extension amount of forty (40) meters may be assigned to a street traversed by cars and other motor vehicles. However, a smaller extension amount of one meter (1 m) may be assigned to a sidewalk along a perimeter of a park.

In still other examples, the extension amount is selected from a table of predetermined extension amounts for a given navigational path. In other words, the extension amount may be a predetermined value associated with a particular navigational path, or category or type of navigational path. In this example, the geofence generator 118 obtains the extension amount value from the lookup table or other database storing extension amount values for one or more navigational paths.

In this example, the geofence generator 118 increases the distance by the extension amount to encompass at least a portion of a width of the navigational path. The geofence generator 118 defines a geofence for the POI using the route point radius. When a user traveling along the portion of the navigational path encompassed by the perimeter of the geofence, the geofence triggers a location based action.

In some examples, the one or more route point radii generated for the POI are stored in a database, data store, filesystem, or other storage associated with one or more data storage device(s) 130. The route point radii are accessible, in some examples, to a plurality of computing devices (e.g., via a network). Each time a user approaches the POI, the geofence is generated for the user using the one or more stored, and already calculated, route point radii.

In another example, pre-generated geofences for corresponding different radii are stored in a data storage. The appropriate pre-generated geofence is retrieved for a user based on relevant contextual information of the user. For example, if the user is walking, a first pre-generated geofence having a first radius is triggered. If the user context is driving, a second pre-generated geofence having a second, larger radius is retrieved and utilized.

Alternatively, or in addition, data defining the geofence may be stored with the route point radii in the data storage devices 130. In such embodiments, when a user approaches the POI, the stored geofence may be used, or updated prior to use (e.g., based on context of the user).

The data storage device(s) 130 may include one or more spinning magnetic disks or solid state drives. A data storage device in some examples includes, without limitation, one or more hard disks, one or more flash drives, as well as any other type of device for storing data. The data storage device(s) 130 in other examples includes one or more redundant arrays of independent disks (RAID) arrays. In still other examples, the data storage device includes one or more cloud storage on a public or private cloud accessible via the network 116.

The network 116 may include any type of network for connecting the computing device 104 with one or more other devices, such as data storage device(s) 130, computing device 106, or a cloud service. In this example, the network 116 enables an Internet connection via a Wide Area Network (WAN), such as Wi-Fi. In other examples, the network 116 may provide connectivity to other devices via a Local Area Network (LAN), a BLUETOOTH connection, or any other type of network connectivity.

The location determination 120 is a component for determining a location of a user device based on location data and/or sensor data. The location determination 120 may be implemented as hardware and/or software. In some examples, the location determination 120 is implemented as location services.

In some examples, the location determination 120 utilizes data received from one or more sensors in a set of sensors 132 to determine when the user crosses the perimeter of the geofence. The set of sensors 132 may include, without limitation, a global positioning system (GPS), cellular module, or any other location determining sensors.

In still other examples, the geofence generator 118 determines an accuracy of the location determination 120. The geofence generator 118 increases the route point radius in response to determining an accuracy of the location determination exceeds an accuracy threshold. In some examples, the geofence generator 118 increases the route point radius by a predetermined increase amount or a user selected increase amount. In other examples, the geofence generator increases the route point radius by a dynamically determined increase amount to compensate for the decreased accuracy of the location determination.

In yet other examples, the geofence generator 118 decreases the route point radius in response to determining the accuracy of the user's location determination is less than or equal to an accuracy threshold. In other words, when the accuracy is within the threshold levels (e.g., when the accuracy is good or high), the size of the geofence may be decreased. Conversely, when the accuracy is not within the threshold levels (e.g., when the accuracy is poor), the size of the geofence may be increased to ensure that the geofence encompasses the navigational path.

In some examples, the geofence generator 118 decreases the route point radius by a predetermined amount or a user selected amount. The predetermined amount may be a default amount. In still other examples, the geofence generator dynamically determines the decrease amount during runtime based on the accuracy level and/or the contextual environment of the user.

In one example, the geofence generator 118 obtains coordinates for a POI and at least one route point. In some examples, the route point coordinates are obtained via a map cloud service. The geofence generator 118 calculates the perimeter of the geofence. In some examples, the geofence calculates the radius as:

$$R = \text{Distance}[(x,y):(x\text{bar},y\text{bar})] + R(x\text{bar},y\text{bar})]$$

where R is the perimeter radius of the geofence around the POI. The radius is a distance in any standard unit. For example, radius may be measured in meters, feet, inches, miles, or any other standard unit of measurement. In this example, the radius distance is in meters. The radius may be represented or calculated based on two coordinate points, such as, latitude and longitude coordinate points (xbar, ybar). The route point is directly on the route along a map. The geofence generator can estimate the radius covering the navigational path to cover users moving into and out of the perimeter. In some examples, forty meters is sufficient to cover a general road or highway. In other examples, a more precise or road-specific extension amount is utilized.

In some examples, the geofence generator relies on activity detection sources to dynamically determine the user's mode of travel, such as walking or driving (e.g., detecting the activity during the activity by the user). In some examples, a communications interface component 134 includes a network interface card and/or computer-executable instructions (e.g., a driver) for operating the network interface card. Communication between the computing device 104 and other devices may occur using any protocol or mechanism over any wired or wireless connection. In some examples, the communications interface component 134 is operable with short range communication technologies such as by using near-field communication (NFC) tags.

In other examples, a user interface component 112 includes a graphics card for displaying data to the user and receiving data from the user. The user interface component 112 may also include computer-executable instructions (e.g., a driver) for operating the graphics card. Further, the user interface component may include a display (e.g., a touch screen displays or natural user interface) and/or computer-executable instructions (e.g., a driver) for operating the display.

The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. The user interface component 112 may receive data such as coordinates, addresses, and feedback from a user. The user interface component 112 may provide data to the user, such as alerts, navigational instructions, or prompts for feedback from the user.

Figure 2:
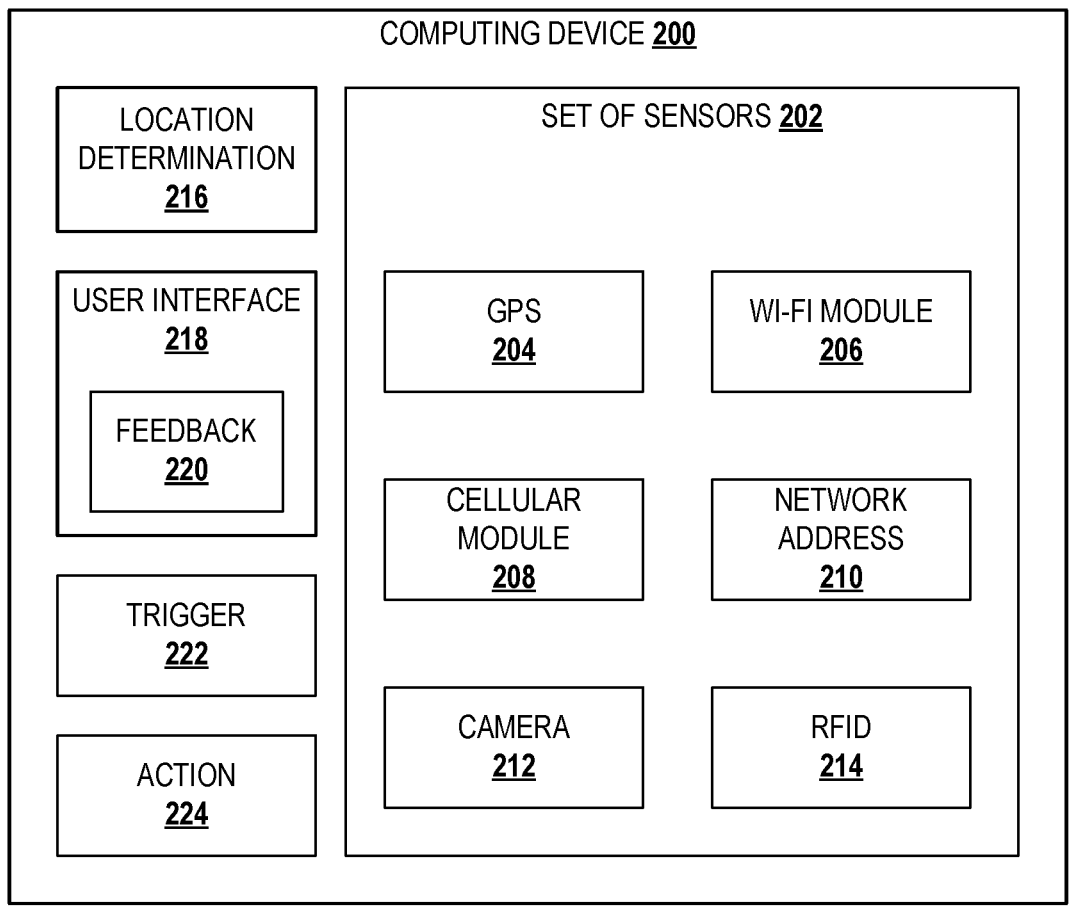
FIG. 2 is an exemplary block diagram illustrating a computing device for defining a geofence.

FIG. 2 is an exemplary block diagram illustrating a computing device for defining a geofence. The computing device 200 includes a set of sensors 202 for determining a location of the computing device 200. The set of sensors 202 may include, for example, but without limitation, a GPS 204, a Wi-Fi module 206, a cellular module 208, a network address 210, a camera 212, a radio frequency identification (RFID) 214 component for detecting RFID signals, or any other type of sensor providing location based data.

The location determination 216 determines whether the computing device 200 has crossed a perimeter of a geofence based on data received from the set of sensors 202. The location determination 216 determines whether a computing device 200 crosses into the area encompassed by the geofence or whether the computing device 200 is crossing the perimeter moving out of the area encompassed by the geofence. The location determination 216 may also determine a length of time the computing device is within the area encompassed by the geofence.

The route point radius in some examples is adjusted based on an accuracy of the location determination. If the location determination is very accurate, the route point radius is decreased to make it more precise. For example, GPS with ten (10) meter accuracy enables a route point radius to be decreased to approximately ten meters. If the location determination is less accurate, the route point radius is increased to ensure detection of the user crossing the perimeter.

User interface 218 in some examples provides user feedback 220. The user feedback 220 may indicate when a user crosses the perimeter of the geofence, whether the geofence trigger occurred in a timely manner, or any other user feedback which may be utilized by the geofence generator to adjust a route point radius.

In one example, a user device may prompt a user to indicate via feedback if the user is entering or exiting a store. The geofence generator utilizes the feedback to adjust or fine-tune the route point radius to improve accuracy and reliability of the geofence. In another example, the user device prompts the user to provide feedback indicating whether the user reached the POI. The route point radius is adjusted based on the feedback.

The trigger 222 occurs when the computing device 200 crosses a portion of a perimeter of the geofence. In some examples, the trigger 222 occurs when the user crosses a portion of the geofence encompassing at least a portion of the navigational path on which the user is traveling. The trigger 222 initiates an action 224. The action 224 is a location based action 224. The action 224 may include, without limitation, providing an alert, alarm, a light, a vibration, a verbal instruction, an audible sound, or any other type of action.

Figure 3:
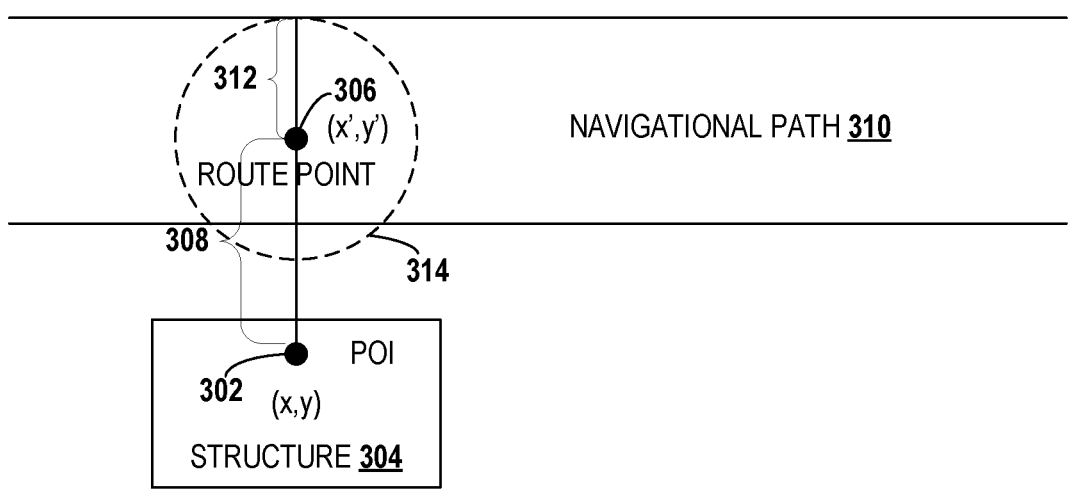
FIG. 3 is an exemplary block diagram illustrating a geofence associated with a point of interest (POI).

FIG. 3 is an exemplary block diagram illustrating a geofence associated with a POI. Geofence system 300 includes a POI 302 associated with a structure 304. The geofence generator obtains coordinates (x, y) of the POI 302. The geofence generator obtains a route point 306 on a navigational path 310. The route point 306 in some examples is a street address.

In other examples, the route point is a set of coordinates for a point on the navigational path 310. The coordinates for the route point in some examples include a latitude and a longitude (x', y'). In still other examples, the coordinates of the route point are a geolocation position tuple including a latitude, longitude, and an altitude.

The geofence generator determines a distance between the POI 302 to the route point 306. The geofence generator adds an extension amount 312 to the distance 308 to generate a route point radius. A geofence perimeter 314 encompassing at least a portion of the navigational path 310 is generated.

In this example, the perimeter 314 encompasses a portion of the navigational path 310 but excludes the POI 302. In other examples, the perimeter 314 encloses the POI and the portion of the navigational path 310.

Figure 4:
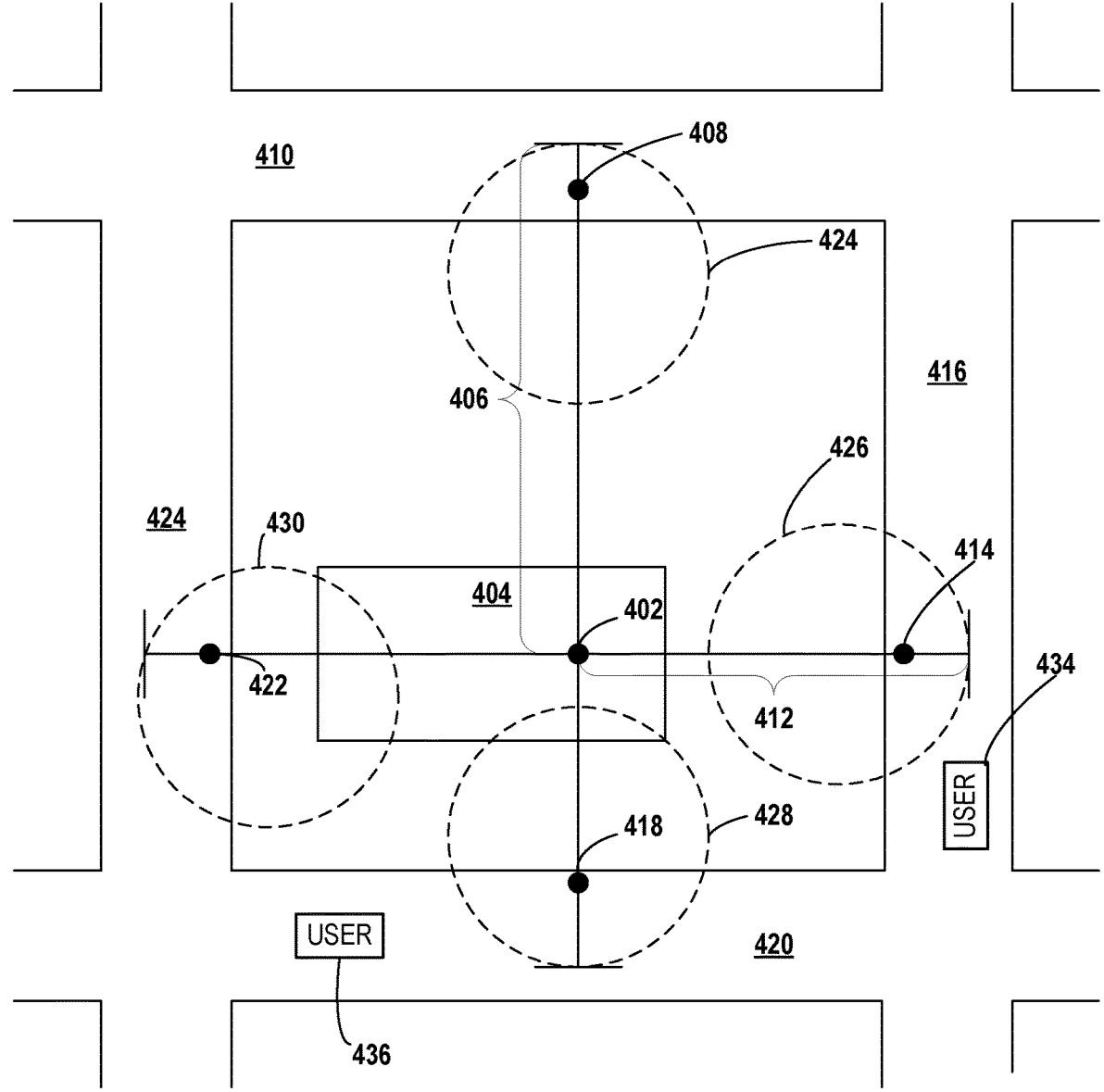
FIG. 4 is an exemplary block diagram illustrating a plurality of route point radii associated with a POI.

FIG. 4 is an exemplary block diagram illustrating a plurality of route point radii associated with a POI. The geofence generator in some examples generates a plurality of route point radii for a given POI 402. In this example, the POI 402 in this example is associated with a structure 404. The geofence generator in this example creates a first route point radius 406 associated with a first route point 408 on a portion of a first navigational path 410. The geofence generator creates a second route point radius 412 associated with a second route point 414 located on a portion of a second navigational path 416.

The plurality of route point radii may also include a third route point radius associated with a third route point associated with a third route point 418 on a portion of a third navigational path 420. In other examples, the plurality of route point radii includes a fourth route point radius for a fourth route point 422 on a portion of a fourth navigational path 424.

In some examples, the geofence generator averages the plurality of route point radii to obtain an average route point radius. In this example, the route point radii associated with route points 408, 414, 418, and 422 are averaged to obtain the average route point radius. The geofence generator defines a geofence perimeter using the average route point radius.

In other examples, the geofence generator compares the route point radii in the plurality of route point radii to identify a maximum route point radius. The geofence generator defines a geofence using the maximum route point radius. In this example, the route point radius associated with the route point 408 is identified as the maximum route point radius. The geofence generator generates a geofence having a perimeter radius 406.

In other examples, the geofence generator compares the route point radii in the plurality of route point radii to identify a minimum route point radius. The geofence generator defines a geofence using the minimum route point radius. In this example, the route point radius associated with the route point 408 is the maximum route point radius.

In this example, the geofence perimeter 424 encompasses route point 408 and a portion of the navigational path 410. In some examples, the geofence perimeter surrounds a POI or the coordinates of the POI. The geofence perimeter 426 in this example encompasses a portion of the navigational path 416 including route point 414. The geofence 426 triggers when a user, such as user 434 crosses the perimeter 426 of the geofence 426. Likewise, in this example, the geofence perimeter 428 encompasses a portion of the navigational path 420 including the route point 418. The geofence perimeter 430 in this example encompasses the navigational path 424 including route point 424. The geofence triggers when a user, such as user 436 crosses the perimeter.

In other examples, a single route point radius is selected to encompass all route points and a portion of all navigational paths associated with the POI. In other words, the geofence generator calculates a route point radius for a geofence perimeter that will encompass all the route points 408, 414, 418, 424, and a portion of each of the navigational paths 410, 416, 420, and 424. In this manner, a single geofence perimeter is generates that will trigger when a user approaches the perimeter of the geofence while traveling along any of the navigational paths adjacent to the POI. In this example, the adjacent navigational paths are paths 410, 416, 420, and 424.

In this example, the navigational paths 410, 416, 420, and 424 are streets for motor vehicles. In other examples, the navigational paths may include sidewalks, hiking trails, bike paths, alleyways, or any other type of path.

In this example, the geofence generator receives contextual data identifying a context of a user. For example, the contextual data may indicate a direction of travel, a mode of travel, a speed of travel, or any other real-time contextual data. The geofence perimeter is adjusted based on the contextual data. For example, if user 434 is moving north, the geofence perimeter is expanded to encompass all of the north bound lanes along navigational path 416. If the user 434 is traveling south, the geofence perimeter is adjusted to decrease the route point radius to only include the south bound lanes of traffic.

Likewise, if user 436 is traveling east, the perimeter 428 of the geofence is expanded to encompass all of the east bound lanes of traffic. If the user 436 is traveling west, the geofence is adjusted to encompass the west bound lanes while excluding the east bound lanes. In this manner, the geofence perimeter is fine-tuned for greater accuracy and efficiency in detecting user movements into and out of a given geofence area.

Figure 5:
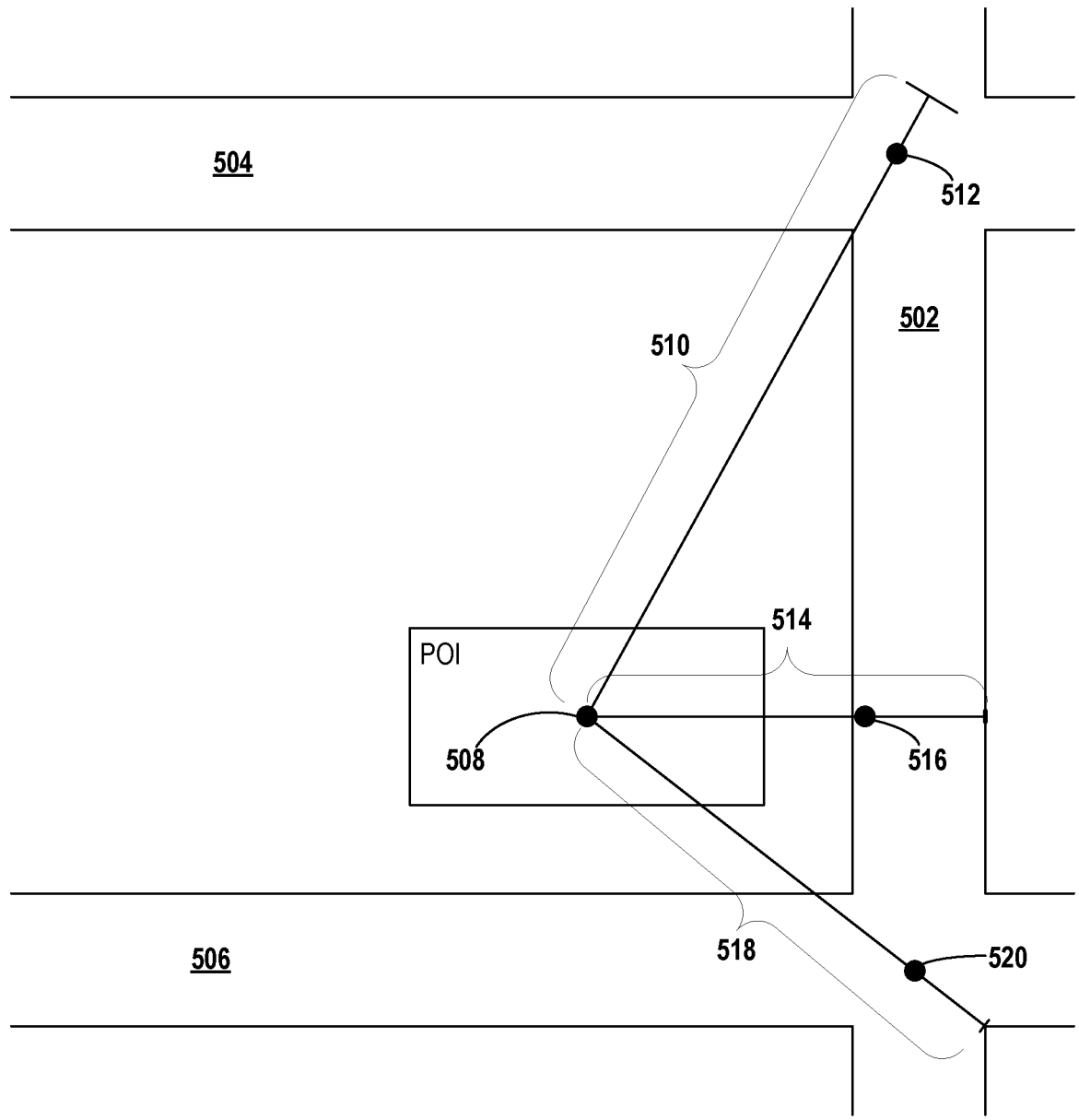
FIG. 5 is an exemplary block diagram illustrating a plurality of route point radii associated with a navigational path.

FIG. 5 is an exemplary block diagram illustrating a plurality of route point radii associated with a navigational path. In this example, the geofence generator determines a plurality of route point radii for a plurality of route points along a given navigational path. The plurality of route point radii includes two or more route point radii for a given POI 508.

The plurality of route point radii in this example includes route point radius 510 is a radius associated with route point 512 at an intersection of navigational path 504 and navigational path 502. The route point radius 514 is a radius based on route point 516 on navigational path 502. The route point radius 518 is a radius associated with route point 520 at an intersection of navigational path 506 and navigational path 502.

In some examples, the geofence generator obtains multiple route point radii and identifies the maximum route point radii to generate the perimeter of the geofence. In other examples, the geofence generator identifies a minimum route point radius from the plurality of route point radii. The minimum route point radius is used to generate the geofence perimeter. In still other examples, the geofence generator takes an average of the route point radii to identify an average route point radius.

Figure 6:
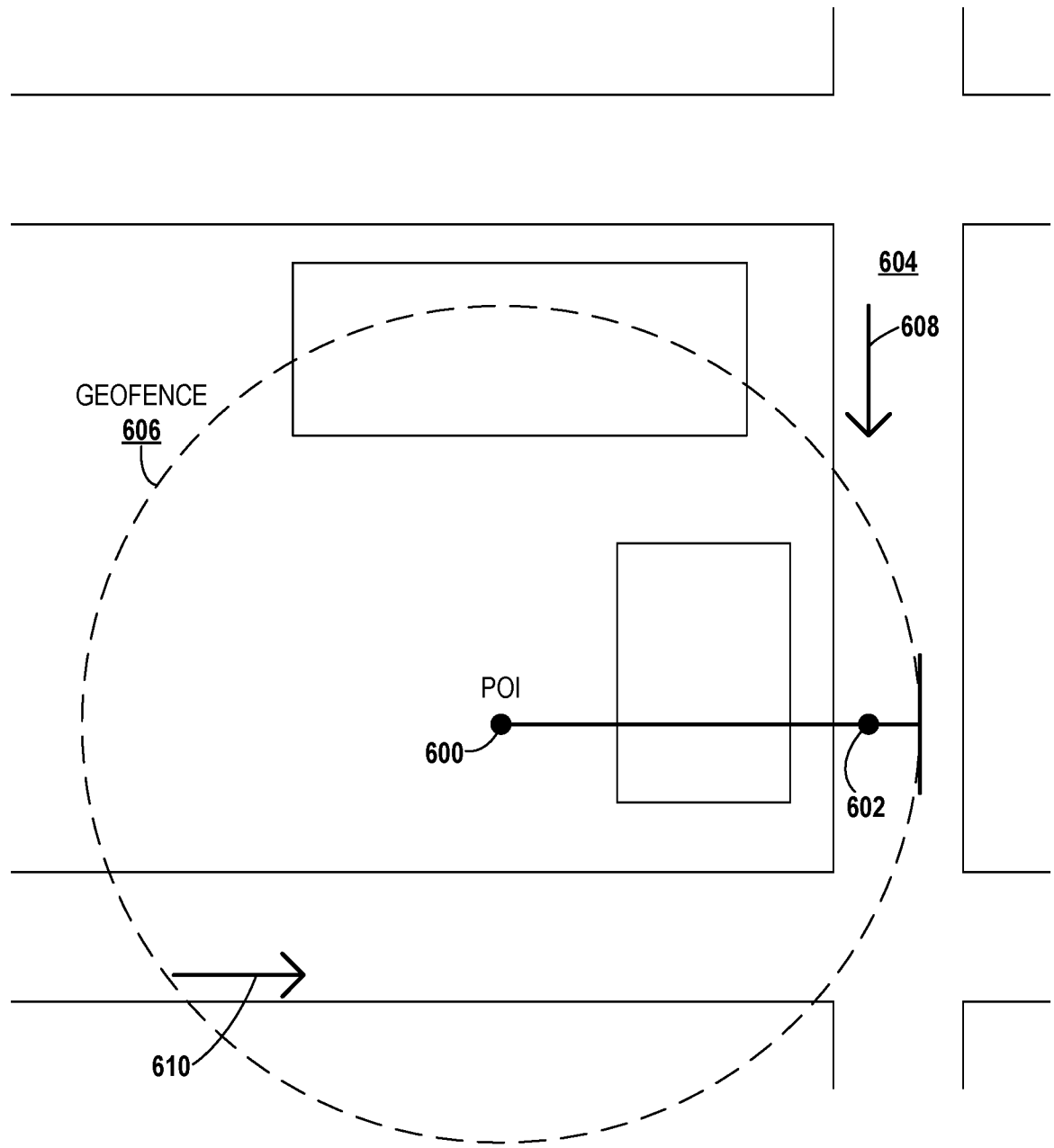
FIG. 6 is an exemplary block diagram illustrating a route point radius for a POI located outside a structure.

FIG. 6 is an exemplary block diagram illustrating a route point radius for a POI located outside a structure. The POI 600 in this example is located outside a structure. The geofence generator identifies a route point radius associated with route point 602 encompassing a portion of a navigational path 604. A geofence perimeter 606 is generated using the route point radius.

In this example, the route point radius is generated dynamically based on a contextual environment of a user. The contextual data indicates the user is traveling south 608 along navigational path 604. In this example, the navigational path is a two-lane street having a north bound lane and a south bound lane. The route point radius is adjusted to encompass the south bound lane of the navigational path.

In other examples, the route point radius is retrieved from a data storage device. The route point radius is selected from a plurality of route point radii stored in the data storage device based on the given POI 600, the user, and/or the computing device being used by the user. In other examples, the route point radius is selected based on the given POI 600 and the contextual environment.

In some examples, a route point radius generated for a given POI is stored and utilized by multiple users and/or multiple user devices. In other examples, the route point radius for a given POI that is device-specific. A device-specific route point radius is utilized to generate a perimeter of a geofence for a specific user device. When a user utilized a different user device, a different route point radius is calculated or retrieved from the data storage. In still other examples, the route point radius is user-specific. A user-specific route point radius is utilized by all user devices associated with a specific user.

The contextual environment includes the mode of travel, speed of travel, and/or direction of travel. The direction of travel may include north, south 608, east 610, west, northeast, southeast, northwest, and/or southwest. The mode of travel indicates whether the user is walking, jogging, riding a bike, riding in a motor vehicle, etc. In some examples, the route point radius is increased to encompass the lane of traffic in which the user is traveling. If the user is traveling south in a far left lane which is further away from the route point, the route point radius is increased to include the far left lane. If the user is traveling in north in a closer right lane that is near the route point, the route point radius is decreased to include the right lane but exclude the left lanes of traffic or exclude at least a portion of the left lanes of traffic. This adjustment of the route point radius improves the precision of the geofence.

Figure 7:
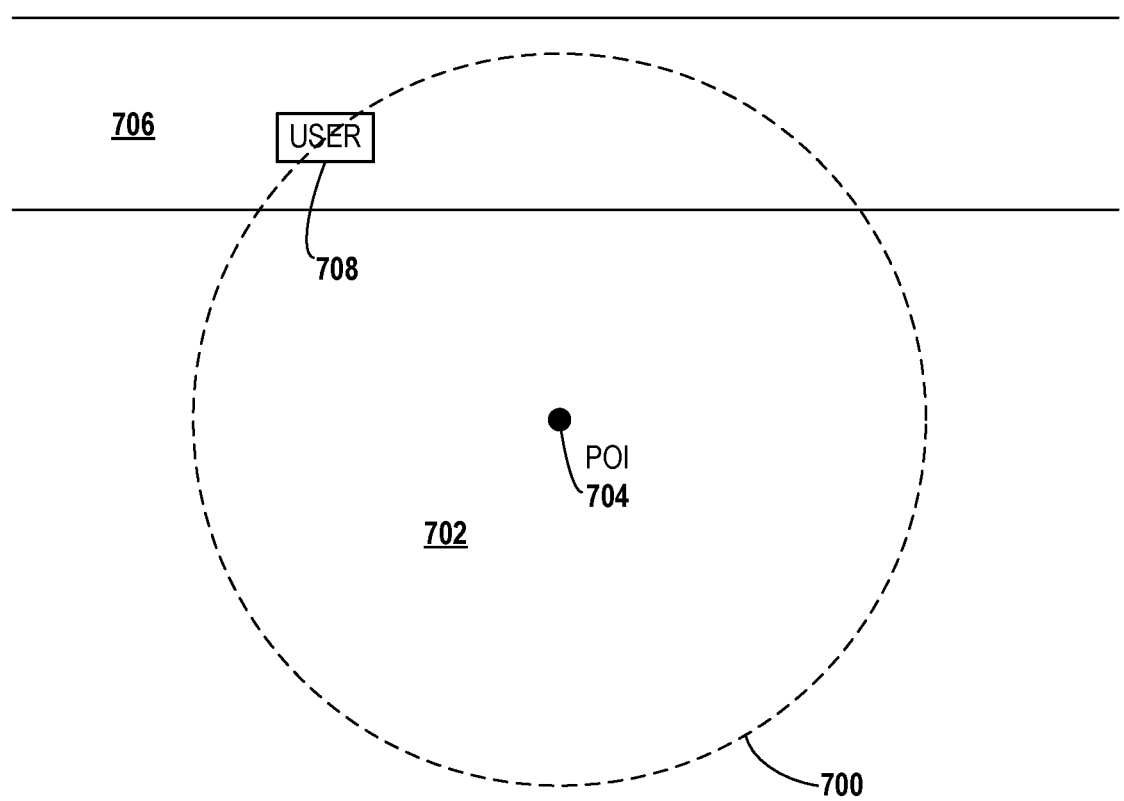
FIG. 7 is an exemplary block diagram illustrating a geofence based on a route point radius.

FIG. 7 is an exemplary block diagram illustrating a geofence based on a route point radius. The perimeter 700 of a geofence in this example encompasses an area 702 surrounding a POI 704. The perimeter 700 encompasses a portion of a navigational path 706. A user 708 traveling along the navigational path 706 triggers the geofence when the user 708 crosses the portion of the perimeter of the geofence enclosing part of the navigational path 706. The user 708 may cross the perimeter 700 when entering the geofence area 702 or when exiting the geofence area 702. The geofence area 702 is adjusted by dynamically changing a radius of the geofence perimeter based on the route point on the navigational path and the contextual environment associated with the user 708.

Figure 8:
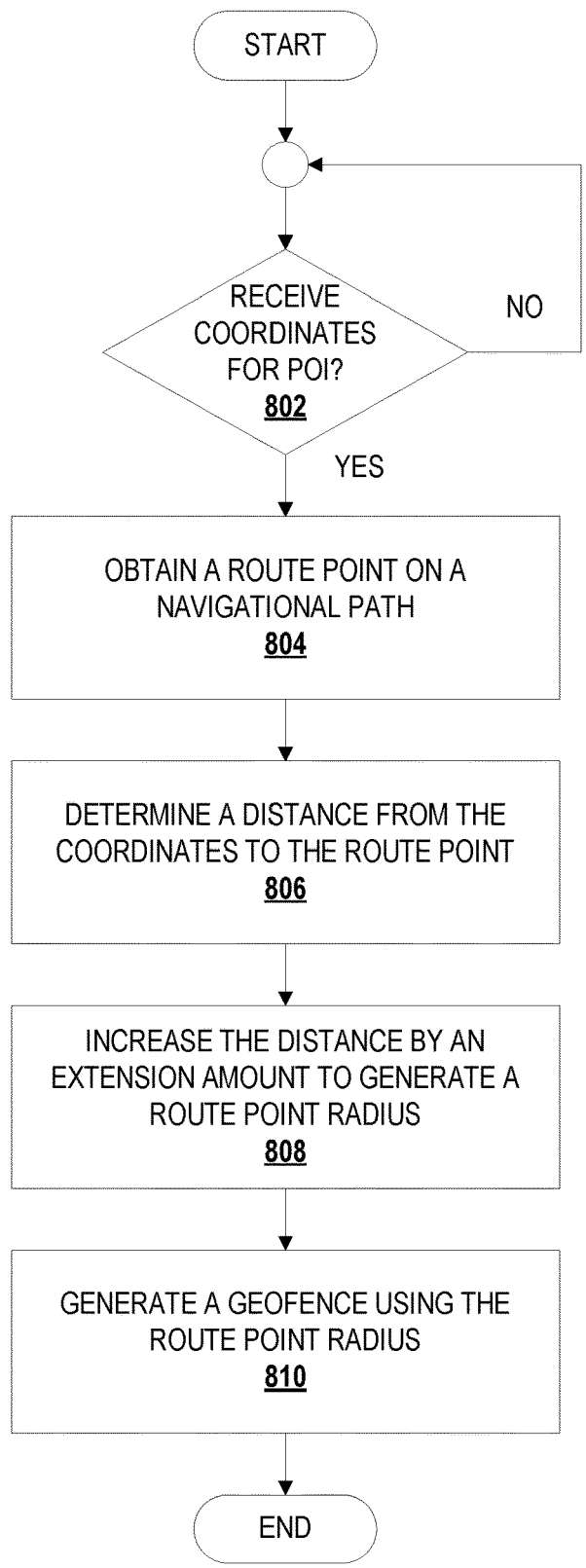
FIG. 8 is an exemplary flowchart illustrating operation of the computing device to generate a route point radius for a geofence.

FIG. 8 is an exemplary flowchart illustrating operation of the computing device to generate a route point radius for a geofence. The process shown in FIG. 8 may be performed by a geofence generator running on a computing device, such as, but not limited to, geofence generator 118 in FIG. 1. Further, execution of the operations illustrated in FIG. 8 is not limited to a computing device. One or more computer-readable storage media storing computer-readable instructions may execute to cause at least one processor to implement the operations illustrated in FIG. 8.

A determination is made as to whether coordinates for a POI is received at 802. If yes, a route point on a navigational path is obtained at 804. A distance from the coordinates to the route point is determined at 806. The distance is increased by an extension amount to generate a route point radius at 808. A geofence is generated using the route point radius at 810. The process terminates thereafter While the operations illustrated in FIG. 8 are described as being performed by a mobile computing device, aspects of the disclosure contemplate that performance of the operations by other entities. For example, a server or a cloud service may perform one or more of the operations.

Figure 9:
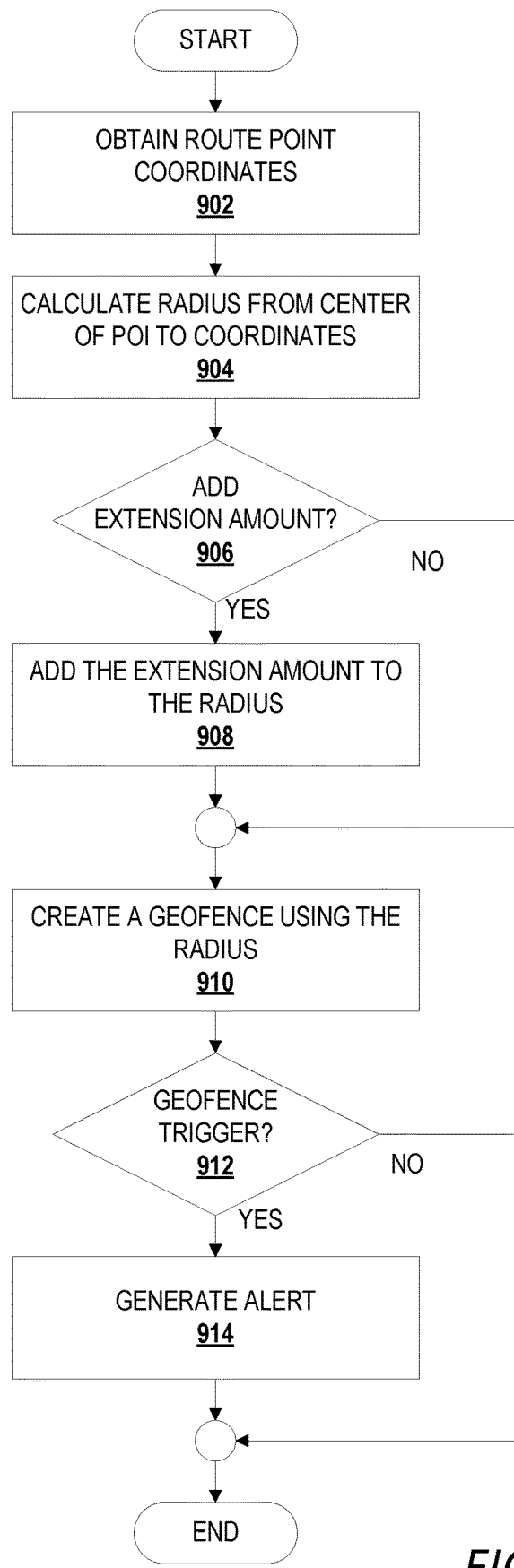
FIG. 9 is an exemplary flowchart illustrating operation of the computing device to generate a geofence.

FIG. 9 is an exemplary flowchart illustrating operation of the computing device to generate a geofence. The process shown in FIG. 9 may be performed by a geofence generator running on a computing device, such as, but not limited to, geofence generator 118 in FIG. 1. Further, execution of the operations illustrated in FIG. 9 is not limited to a computing device. One or more computer-readable storage media storing computer-readable instructions may execute to cause at least one processor to implement the operations illustrated in FIG. 9.

Coordinates of a route point are obtained at 902. A radius from the center of a POI to the coordinates is calculated at 904. A determination is made as to whether to add an extension amount at 906. If yes, the extension amount is added to the radius at 908. The radius is a route point radius. A geofence is created using the radius at 910. A determination is made as to whether the geofence is triggered at 912. If yes, an alert is generated at 914. The process terminates thereafter.

In the example shown in FIG. 9, an alert is generated when the geofence is triggered by a user crossing into or crossing out of the perimeter of the geofence. In other examples, any location based action is performed when the geofence is triggered. The location based action may include providing navigation instructions, sounding an alarm, vibrating, flashing an image or color warning light, turning on one or more lights, turning off one or more lights, opening a door, or any other action.

While the operations illustrated in FIG. 9 are described as being performed by a mobile computing device, aspects of the disclosure contemplate that performance of the operations by other entities. For example, a server or a cloud service may perform one or more of the operations.

Figure 10:
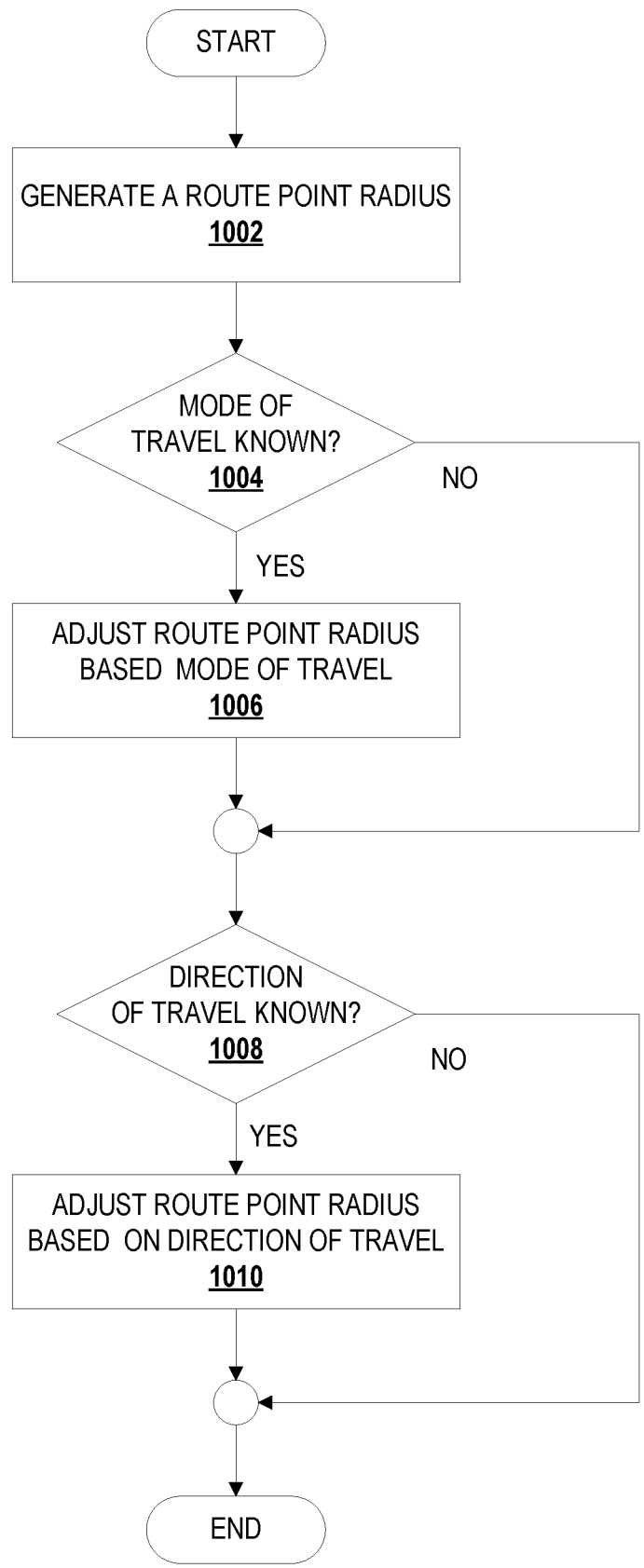
FIG. 10 is an exemplary flowchart illustrating operation of the computing device to adjust a route point radius based on a contextual environment.

FIG. 10 is an exemplary flowchart illustrating operation of the computing device to adjust a route point radius based on a contextual environment. The process shown in FIG. 10 may be performed by a geofence generator running on a computing device, such as, but not limited to, geofence generator 118 in FIG. 1. Further, execution of the operations illustrated in FIG. 10 is not limited to a computing device. One or more computer-readable storage media storing computer-readable instructions may execute to cause at least one processor to implement the operations illustrated in FIG. 10.

A route point radius is generated at 1002. A determination is made as to whether a mode of travel of the user is known at 1004. If yes, the route point radius is adjusted based on the mode of travel at 1006. A determination is made as to whether a direction of travel of the user is known at 1008. If yes, the extension amount added to the route point radius is adjusted based on the direction of travel at 1010. The process terminates thereafter.

In this example, a determination is made as to whether mode of travel and direction of travel is known. In other examples, the geofence generator makes a determination as to whether a speed of travel of the user is known. In this example, the route point radius is adjusted based on the speed of travel, if known.

While the operations illustrated in FIG. 10 are described as being performed by a mobile computing device, aspects of the disclosure contemplate that performance of the operations by other entities. For example, a server or a cloud service may perform one or more of the operations.

Figure 11:
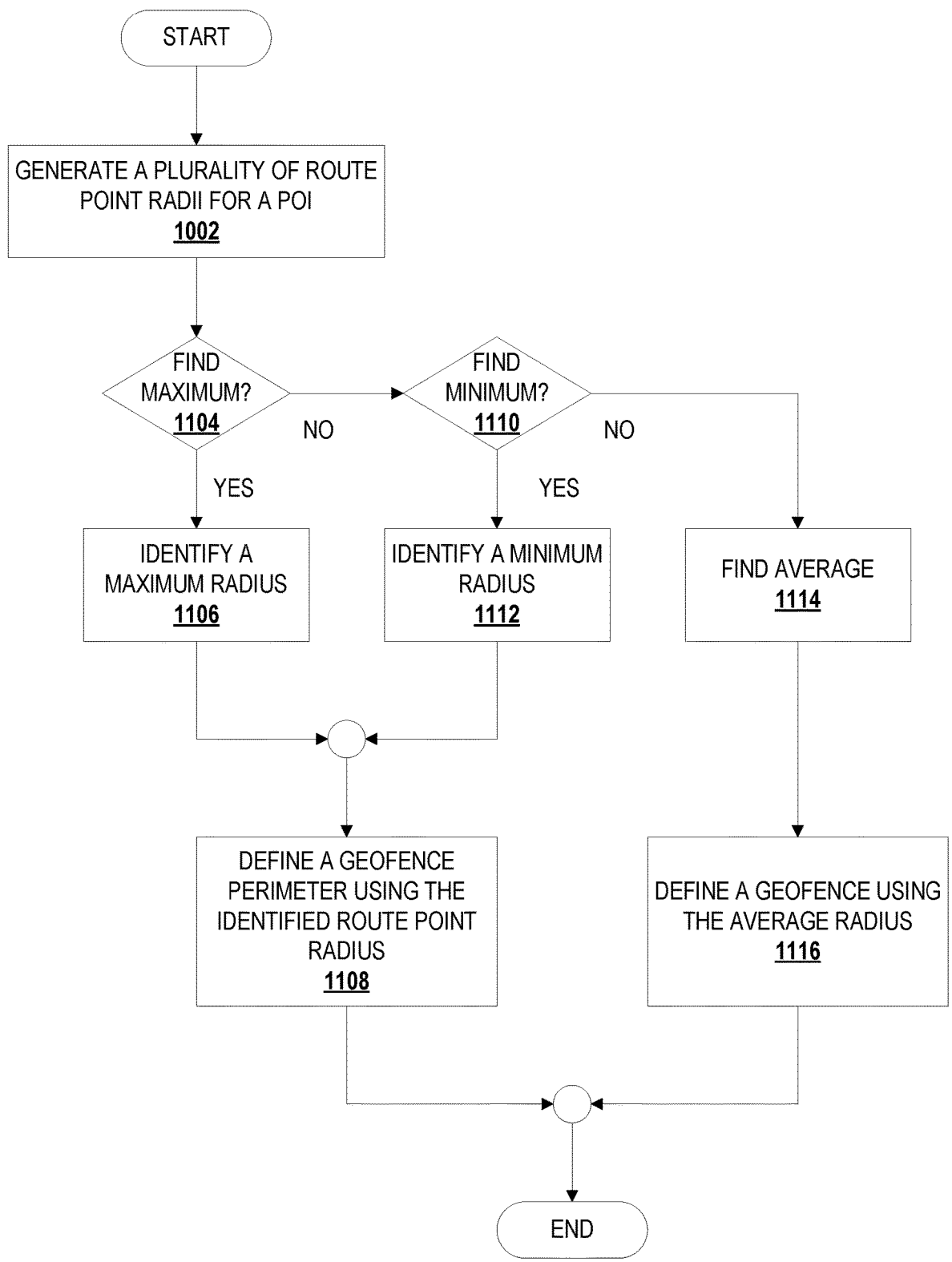
FIG. 11 is an exemplary flowchart illustrating operation of the computing device to adjust a route point radius based on a contextual environment.

FIG. 11 is an exemplary flowchart illustrating operation of the computing device to adjust a route point radius based on a contextual environment. The process shown in FIG. 11 may be performed by a geofence generator running on a computing device, such as, but not limited to, geofence generator 118 in FIG. 1. Further, execution of the operations illustrated in FIG. 11 is not limited to a computing device. One or more computer-readable storage media storing computer-readable instructions may execute to cause at least one processor to implement the operations illustrated in FIG. 11.

A plurality of route point radii is generated for a POI at 1102. A determination is made as to whether to find a maximum route point radius at 1104. If yes, a maximum route point radius is identified at 1106. A geofence perimeter is defined using the identified maximum route point radius at 1108. The process terminates thereafter.

Returning now to 1104, if a maximum radius is not to be found, a determination is made as to whether to find a minimum route point radius at 1110. If yes, a minimum route point radius in the plurality of route point radii is identified 1112. A geofence perimeter is identified using the identified minimum route point radius at 1108. The process terminates thereafter.

Returning now to 1110, if a minimum route point radius is not to be found at 1110, an average route point radius of the plurality of route point radii is found at 1114. A geofence perimeter is defined using the average route point radius at 1116. The process terminates thereafter.

While the operations illustrated in FIG. 11 are described as being performed by a mobile computing device, aspects of the disclosure contemplate that performance of the operations by other entities. For example, a server or a cloud service may perform one or more of the operations.

Additional Examples

In some examples, a system for determining a route point radius for a geofence is provided. The system includes a memory and a processor associated with a mobile computing device. The memory stores computer executable program code. The processor programmed to obtain coordinates for a route point on a navigational path associated with a POI; calculate a radius from a center of the POI to the coordinates of the route point; add an extension amount encompassing at least a portion of the navigational path to the radius to generate a route point radius; define a geofence for the POI based on the route point radius; and trigger a location based action on determining a user crosses a perimeter of the geofence associated with the at least a portion of the navigational path. The location based action may include generating an alert, sending a message, flashing a light, vibrating, providing a navigational instruction, or any other type of action.

In other examples, one or more computer storage media embodying computer-executable components is provided. The computer-executable components include a geofence generator component that when executed causes at least one processor to determine a distance from coordinates of a POI to a route point; an extension adjustment component that when executed causes at least one processor to determine an extension amount associated with at least a portion of a navigational path corresponding to the route point, the geofence generator component adds the extension amount to the distance to generate a route point radius; and a context engine component that when executed causes at least one processor to determine a contextual environment of a user, the geofence generator adjust the route point radius based on the contextual environment of a user and generates a geofence based on the route point radius.

In an example scenario, the geofence generator calculates a route point radius for a geofence perimeter around a meaningful civic address, landmark, or other POI that is as inclusive as possible of the street, sidewalk, or other navigational path around the POI that users walk or drive on and which crosses the perimeter of the geofence. As a user travels towards the POI, the user triggers the geofence when the user crosses the perimeter of the geofence that encompasses at least a portion of the navigational path on which the user is traveling.

Alternatively, or in addition to the other examples described herein, examples include any combination of the following:
  trigger a location based function on determining a user crosses a perimeter of the geofence associated with the at least a portion of width of the navigational path;
  determine a second route point radius associated with a second route point, the second route point encompassing at least a portion of a second navigational path associated with the POI;
  comparing the first route point radius to the second route point radius to identify a minimum route point radius and generate the geofence based on the minimum route point radius;
  compare the first route point radius to the second route point radius to identify a maximum route point radius and generate the geofence based on the maximum route point radius;
  average a plurality of route point radii associated with a POI to identify an average route point radius and generate the geofence based on the average route point radius;
  determine a contextual environment of a user, wherein the contextual environment comprises a direction of travel and a mode of travel, wherein the mode of travel comprises walking, biking, or driving and adjust the route point radius based on the direction of travel and the mode of travel;
  the route point is a street address associated with the navigational path, and wherein the POI is located remotely from the navigational path;
  generate a plurality of route point radii associated with a plurality of route points, each route point in the plurality of route points encompassing at least a portion of at least one navigational path associated with the POI; identify a minimum route point radius in the plurality of route point radii to radius; and generate the geofence based on the minimum route point radius;
  generate a plurality of route point radii associated with a plurality of route points, each route point in the plurality of route points encompassing at least a portion of at least one navigational path associated with the POI; identify a maximum route point radius in the plurality of route point radii to radius; and generate the geofence based on the maximum route point radius.
  generate a plurality of route point radii associated with a plurality of route points, each route point in the plurality of route points encompassing at least a portion of a navigational path associated with the POI; average the plurality of route point radii to identify an average route point radius; and generate the geofence based on the average route point radius.
  determine an accuracy of a location determination component; increase the route point radius by a predetermined increase amount in response to determining an accuracy of the location determination exceeds an accuracy threshold; and decrease the route point radius by a predetermined decrease amount in response to determining the accuracy of the location determination is less than or equal to an accuracy threshold;
  receive feedback from a user confirming whether the user crossed into or out of the geofence; and adjust the route point radius of the geofence based on the feedback;
  dynamically adjust the route point radius based on a contextual environment of the user, wherein the contextual environment of the user comprises a mode of travel and a direction of travel;
  the contextual environment includes a user walking on the navigational path, wherein the geofence generator decreases the route point radius in response to a user walking on the navigational path;
  the contextual environment includes a user driving a motor vehicle on the navigational path, wherein the geofence generator increases the route point radius in response to the contextual environment including a user driving;
  a geofence trigger component that when executed causes at least one processor to trigger a geofence alert on detecting a user crossing a perimeter of the geofence associated with the at least a portion of the navigational path;
  the route point is a first route point and wherein the route point radius is a first route point radius and wherein the geofence generator component is further executed to: determine a second route point radius associated with a second route point, the second route point encompassing at least a portion of a second navigational path associated with the POI; determine a third route point radius associated with a third route point, the third route point encompassing at least a portion of a third navigational path associated with the POI; compare the first route point radius, the second route point radius, and the third route point radius to identify a maximum route point radius; and generate the geofence using the maximum route point radius; and the route point is a first route point and wherein the route point radius is a first route point radius and wherein the geofence generator component is further executed to: determine a second route point radius associated with a second route point, the second route point encompassing at least a portion of a second navigational path associated with the POI; determine a third route point radius associated with a third route point, the third route point encompassing at least a portion of a third navigational path associated with the POI; compare the first route point radius, the second route point radius, and the third route point radius to identify a minimum route point radius; and generate the geofence using the minimum route point radius.

At least a portion of the functionality of the various elements in FIG. 1 may be performed by other elements in FIG. 2, or an entity (e.g., processor, web service, server, application program, computing device, etc.) not shown in FIG. 1.

In some examples, the operations illustrated in FIG. 8, FIG. 9, FIG. 10, and FIG. 11 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for generating at least one route point radius for a contextual geofence. For example, the elements illustrated in FIG. 1 and FIG. 2, such as when encoded to perform the operations illustrated in FIG. 8, FIG. 9, FIG. 10, and FIG. 11, constitute exemplary means for receiving coordinates for a POI; exemplary means for obtaining a route point corresponding to the POI, the route point being on a navigational path; exemplary means for determining a distance from the coordinates to the obtained route point; exemplary means for increasing the distance by an extension amount to encompass at least a portion of a width of the navigational path to generate a route point radius; and exemplary means for defining a geofence for the POI using the route point radius.

In another example, the elements illustrated in FIG. 1 and FIG. 2, such as when encoded to perform the operations illustrated in FIG. 8, FIG. 9, FIG. 10, and FIG. 11, constitute exemplary means for obtaining coordinates for a route point on a navigational path associated with a POI; exemplary means for calculating a radius from a center of the POI to the coordinates of the route point; exemplary means for adding an extension amount encompassing at least a portion of the navigational path to the radius to generate a route point radius; exemplary means for defining a geofence for the POI based on the route point radius; and exemplary means for triggering a location based action on determining a user crosses a perimeter of the geofence associated with the at least a portion of the navigational path.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for generating a geofence based on a first route point, the method comprising:
   receiving coordinates for a point of interest (POI);
   obtaining the first route point corresponding to the POI, the first route point being associated with a first portion of a navigational path;
   determining a distance from the received coordinates to the obtained first route point;
   defining an extension amount based on a type of the navigational path and a mode of transportation;
   increasing the determined distance by the defined extension amount to generate a first route point radius;
   determining a second route point radius associated with a second route point, the second route point encompassing a second portion of the navigational path;
   comparing the first route point radius to the second route point radius to identify a minimum route point radius or a maximum route point radius;
   defining a perimeter of the geofence surrounding the POI based on the minimum route point radius or the maximum route point radius; and
   triggering a location based function upon determining a user crossing the defined perimeter of the geofence associated with the at least a portion of the navigational path.

2. The method of claim 1, wherein the user crosses the defined perimeter of the geofence at a point associated with the at least a portion of a width of the navigational path.

3. The method of claim 1, further comprising triggering a geofence alert on detecting the user crossing a perimeter of the geofence associated with the at least a portion of the navigational path.

4. The method of claim 1, wherein the extension amount is selected from a table of predetermined extension amounts for a given navigational path.

5. The method of claim 1, further comprising:
   determining a plurality of route point radii associated with a plurality of route points associated with the POI;
   averaging the plurality of route point radii to identify an average route point radius; and
   generating the geofence based further on the average route point radius.

6. The method of claim 1, further comprising:
   dynamically determining a contextual environment of the user, wherein the contextual environment comprises a speed of travel; and
   adjusting the first route point radius based on the determined contextual environment.

7. The method of claim 1, wherein the extension amount is further based on one or more of the following: a type of road.

8. A system for determining a route point radius for a geofence, the system comprising:
   a memory associated with a mobile computing device, said memory storing computer executable program code; and
   a processor programmed to execute the computer executable program code stored in the memory to:
      obtain coordinates for a first route point on a navigational path associated with a point of interest (POI) and a first portion of the navigational path;
      calculate a radius from a center of the POI to the obtained coordinates of the first route point;
      define an extension amount based on a type of the navigational path and a mode of transportation;
      add the extension amount to the calculated radius to generate a first route point radius;
      determine a second route point radius associated with a second route point, the second route point encompassing a second portion of the navigational path;
      compare the first route point radius to the second route point radius to identify a minimum route point radius or a maximum route point radius;
      define a perimeter of the geofence based on the minimum route point radius or the maximum route point radius; and
      trigger a location based action on determining a user crossing the defined perimeter of the geofence associated with at least a portion of the navigational path.

9. The system of claim 8, wherein the user crosses the defined perimeter of the geofence at a point associated with the at least a portion of a width of the navigational path.

10. The system of claim 8, wherein the extension amount is selected from a table of predetermined extension amounts for a given navigational path.

11. The system of claim 8, wherein the processor is further programmed to:
  generate a plurality of route point radii associated with a plurality of route points associated with at least one navigational path;
  average the plurality of route point radii to identify an average route point radius; and
  generate the geofence based further on the average route point radius.

12. The system of claim 8, wherein the processor is further programmed to:
  determine an accuracy of a location determination component;
  increase the first route point radius by a predetermined increase amount in response to determining an accuracy of the location determination exceeds an accuracy threshold; and
  decrease the first route point radius by a predetermined decrease amount in response to determining the accuracy of the location determination is less than or equal to an accuracy threshold.

13. The system of claim 8, wherein the processor is further programmed to:
  receive feedback from the user confirming whether the user crossed into or out of the geofence; and
  adjust the minimum route point radius or the maximum route point radius of the geofence based on the received feedback.

14. The system of claim 8, wherein the processor is further programmed to:
  dynamically adjust the minimum route point radius or the maximum route point radius based on a contextual environment of the user, wherein the contextual environment of the user comprises a direction of travel.

15. One or more computer storage devices embodying computer-executable components, said components comprising:
  a geofence generator component that when executed causes at least one processor to:
    determine a distance from coordinates of a point of interest (POI) to a route point;
    determine a plurality of route point radii associated with a plurality of route points associated with the POI;
    average the plurality of route point radii to identify an average route point radius; and
    generate a geofence based on the average route point radius;
  an extension adjustment component that when executed causes the at least one processor to determine an extension amount based on a type of a navigational path and a mode of transportation corresponding to the route point, the geofence generator component adding the extension amount to the determined distance to generate a route point radius based on the extension amount and the average route point radius; and
  a context engine component that when executed causes the at least one processor to determine a contextual environment of a user, the geofence generator component adjusting the average route point radius based on the contextual environment of the user and generating a revised geofence associated with at least a portion of the navigational path.

16. The one or more computer storage devices of claim 15, wherein the contextual environment comprises the user walking the navigational path, wherein the geofence generator component decreases the average route point radius in response to the contextual environment.

17. The one or more computer storage devices of claim 15, wherein the contextual environment comprises the user riding in a motor vehicle, wherein the geofence generator component increases the average route point radius in response to the contextual environment.

18. The one or more computer storage devices of claim 15, further comprising:
  a geofence trigger component that when executed causes the at least one processor to trigger a geofence alert on detecting the user crossing a perimeter of the geofence associated with the at least a portion of the navigational path.

19. The one or more computer storage devices of claim 15, wherein the route point is a first route point along a first navigational path and wherein the route point radius is a first route point radius and wherein the geofence generator component is further executed to:
  determine a second route point radius associated with a second route point, the second route point encompassing at least a portion of a second navigational path associated with the POI;
  determine a third route point radius associated with a third route point, the third route point encompassing at least a portion of a third navigational path associated with the POI;
  compare the first route point radius, the second route point radius, and the third route point radius to identify a maximum route point radius; and
  generate the geofence further using the maximum route point radius.

20. The one or more computer storage devices of claim 15, wherein the route point is a first route point on a first navigational path and wherein the route point radius is a first route point radius and wherein the geofence generator component is further executed to:
  determine a second route point radius associated with a second route point, the second route point encompassing at least a portion of a second navigational path associated with the POI;
  determine a third route point radius associated with a third route point, the third route point encompassing at least a portion of a third navigational path associated with the POI;
  compare the first route point radius, the second route point radius, and the third route point radius to identify a minimum route point radius; and
  generate the geofence further using the minimum route point radius.

* * * * *